US006438459B1

United States Patent
Dimitri et al.

(10) Patent No.: US 6,438,459 B1
(45) Date of Patent: Aug. 20, 2002

(54) MULTIPLE INDEPENDENT INTELLIGENT PICKERS WITH DYNAMIC ROUTING IN AN AUTOMATED DATA STORAGE LIBRARY

(75) Inventors: Kamal Emile Dimitri; John Edward Kulakowski; Rodney Jerome Means, all of Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/960,970

(22) Filed: Sep. 25, 2001

Related U.S. Application Data

(62) Division of application No. 09/435,023, filed on Nov. 5, 1999, now abandoned.

(51) Int. Cl.[7] .............................................. G05B 19/18
(52) U.S. Cl. ...................... 700/255; 700/214; 414/273
(58) Field of Search ............................. 700/213, 214, 700/218, 228, 229, 245, 255; 414/273, 275

(56) References Cited

U.S. PATENT DOCUMENTS

| | | | | |
|---|---|---|---|---|
| 3,831,197 A | | 8/1974 | Beach et al. ............. 360/71 |
| 5,227,707 A | * | 7/1993 | Mitomi et al. .......... 318/568.1 |
| 5,303,214 A | | 4/1994 | Kulakowski et al. ....... 369/34 |
| 5,395,199 A | | 3/1995 | Day, III et al. ........... 414/267 |
| 5,504,873 A | | 4/1996 | Martin et al. ............. 395/438 |
| 5,513,156 A | | 4/1996 | Hanaoka et al. ........... 369/34 |
| 5,522,090 A | * | 5/1996 | Tanaka et al. ............. 395/894 |
| 5,546,366 A | | 8/1996 | Dang ....................... 369/36 |
| 5,956,301 A | * | 9/1999 | Dimitri et al. ............. 369/34 |
| 6,038,490 A | * | 3/2000 | Dimitri et al. ............. 700/214 |
| 6,161,058 A | * | 12/2000 | Nishijo et al. ............. 700/218 |
| 6,351,685 B1 | * | 2/2002 | Dimitri et al. ............. 700/214 |

OTHER PUBLICATIONS

"Collision–Avoidance Algorithm for Automated Tape Library", IBM Technical Disclosure Bulletin, vol. 36, No. 8, Aug. 1993, pp. 199–200.

* cited by examiner

*Primary Examiner*—Christopher P. Ellis
*Assistant Examiner*—Khoi H. Tran
(74) *Attorney, Agent, or Firm*—John H. Holcombe

(57) ABSTRACT

Multiple intelligent pickers for an automated data storage library, the library having a library controller which identifies the start and end locations of the received move jobs, and places the move jobs in a job queue. The picker processor receives information over a communication link from other pickers describing movement information for the current move job of each of the other pickers. Upon completion of a move job, the picker communicates with the library controller, selecting a move job which avoids interference with the movement of the other pickers. The movement for the selected move job is determined so as to avoid interference with the stored movement profiles of the other pickers. A movement profile may be communicated to the other pickers over the communication link, and the move job is conducted according to the movement profile. Alternatively, movement information comprising the current location and vector are communicated.

12 Claims, 10 Drawing Sheets

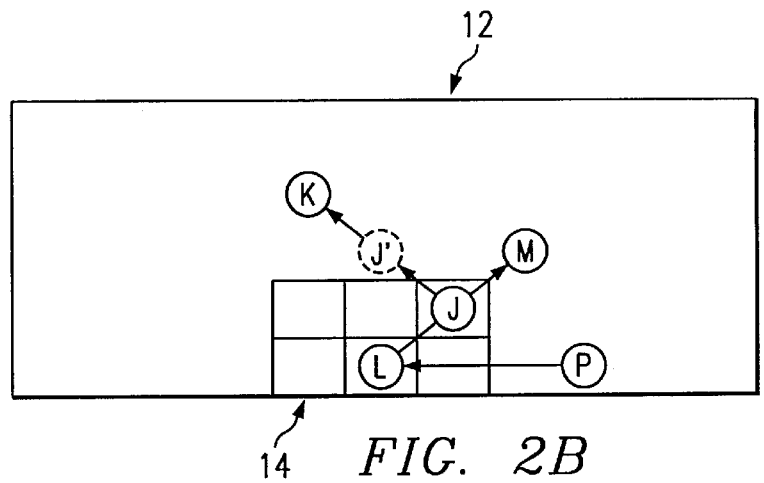
FIG. 2B
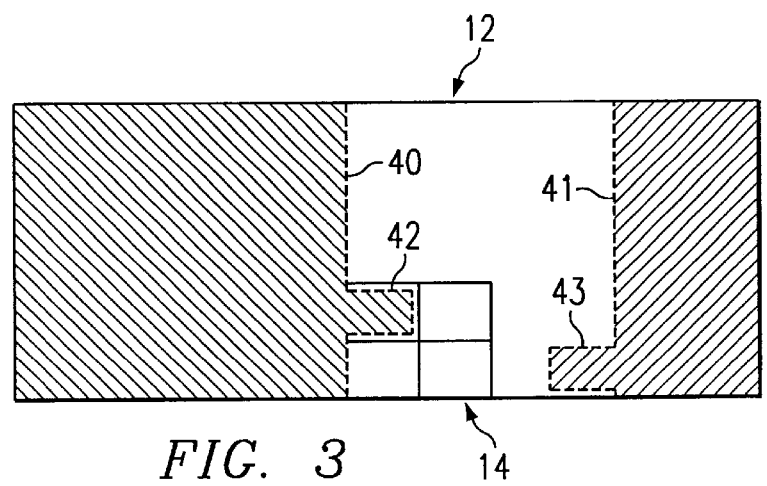
FIG. 3
FIG. 4
| JOB ID | PRIORITY | JOB TYPE | HOST ID | CARTRIDGE VOLSER | START | END |
|---|---|---|---|---|---|---|
| 51 | 52 | 53 | 54 | 55 | 56 | 57 |
QUEUE 50

MOVEMENT PROFILE
| PICKER ID | JOB ID | JOB TYPE | INITIAL | START LOCATION AND TIME | INT 1 | INT 2 | END | PROFILES |
|---|---|---|---|---|---|---|---|---|
| — | — | — | — | — | — | — | — | — |
| — | — | — | — | — | — | — | — | — |
| 61 | 62 | 63 | 64 | 65 | 66 | 67 | 68 | 69 |
*FIG. 5*
PRESENT MOVEMENT
| PICKER ID | LOCATION X | LOCATION Y | VX | VY | END LOCATION | CLOCK |
|---|---|---|---|---|---|---|
| — | — | — | — | — | — | — |
| — | — | — | — | — | — | — |
| 81 | 82 | 83 | 84 | 85 | 86 | 87 |
*FIG. 15*
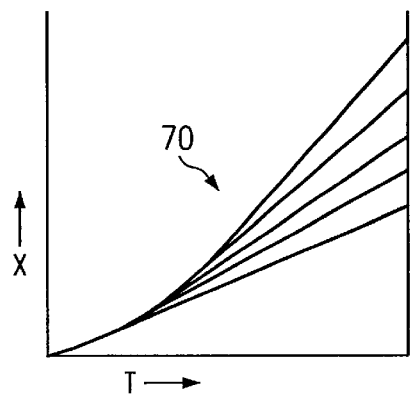
*FIG. 6A*
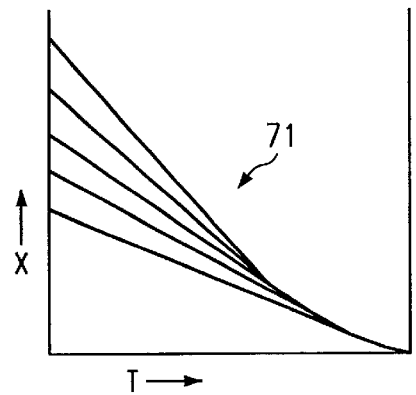
*FIG. 6B*

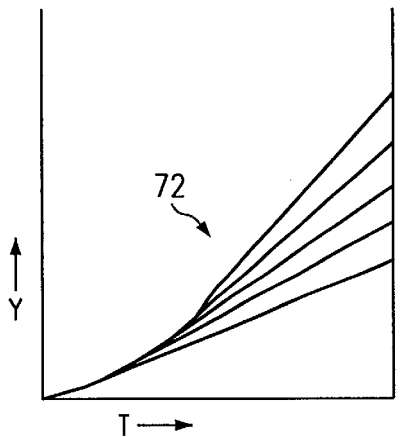
FIG. 7A
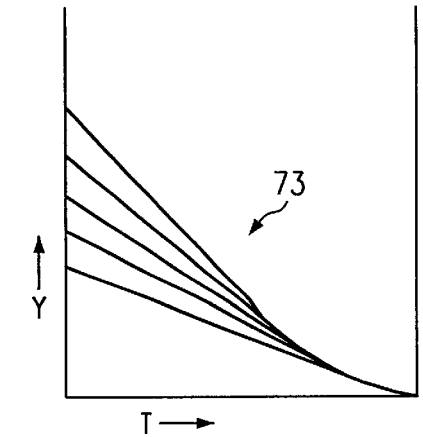
FIG. 7B
| PROFILE ID (78) | X v T LIST (76) |
|---|---|
| UNLOADED | MAX SPEED ↓    LENGTH ↓ |
| LOADED | MAX SPEED ↓    LENGTH ↓ |
FIG. 8A
| PROFILE ID (79) | Y v T LIST (77) |
|---|---|
| UNLOADED | MAX SPEED ↓    LENGTH ↓ |
| LOADED | MAX SPEED ↓    LENGTH ↓ |
FIG. 8B

MULTIPLE INDEPENDENT INTELLIGENT PICKERS WITH DYNAMIC ROUTING IN AN AUTOMATED DATA STORAGE LIBRARY

CROSS REFERENCE TO RELATED APPLICATION

Coassigned U.S. patent application Ser. No. 09/434,396, now U.S. Pat. No. 6,351,685, filed on even date herewith relates to wireless communication between multiple intelligent pickers and with a central job queue in an automated data storage library.

FIELD OF THE INVENTION

This is a Divisional application of Ser. No. 09/435,023, filed Nov. 5, 1999, now abandoned. This invention relates to automated data storage libraries, and, more particularly, to libraries having a plurality of pickers for accessing data storage media stored in the library, and for accessing and delivering the media between media storage slots and read/write stations.

BACKGROUND OF THE INVENTION

Automated data storage libraries are known for providing cost effective access to large quantities of stored data. Generally, data storage libraries include a large number of media storage slots in which are stored portable data storage media. The typical data storage media is a tape cartridge or an optical disk cartridge. A picker typically accesses the data storage media from the media storage slots and delivers the accessed media to a data storage drive at a read/write station for reading and/or writing data on the accessed media. The operation of the picker is under the control of a library controller which is coupled by wires to suitable electronics, such as an accessor or robot control, which operates servo motors to move the picker.

The need to store ever increasing numbers of volumes of data with the ability to access that data rapidly has led to the use high capacity automated data storage libraries with multiple pickers.

Conventional automated data storage libraries having multiple pickers avoid collisions by assigning pickers to zones within the library. An example is U.S. Pat. No. 5,513,156. These zones are separated by a zone boundary area which prevent two pickers from interfering with each other. When a media is to be moved to an area outside of the normal zone of a picker, either the media is exchanged from a first picker to a second picker by delivering it to a storage slot accessible by both pickers, or the zone boundary is moved, or the second picker is moved out of the way or into a garage.

Thus, the read/write stations must be positioned at different locations in the library so that they can be separately accessed by each of the pickers in its zone. Further, if all of the data storage media requested by the host system is in one zone of the library, all of the media must be accessed by a single one of the pickers, while the other picker is idle. Still further, if a read/write station in one zone is inoperative, the picker for that zone has only reduced capability because it has no access to the other read/write stations in the other zone. As the result, the effectiveness of the library is reduced.

Additionally, the conventional library controller directly controls the operation of the pickers, and is coupled to the pickers by means of electrical wiring to operate the robot servo processor in each picker. Thus, the library is subject to failure of the wiring between the controller and the multiple pickers, and the pickers must be operated so that the wiring does not become tangled. A library having storage cells below a floor laying in a horizontal plane with wireless vehicles for accessing the storage cells is shown in coassigned U.S. Pat. No. 5,395,199, but employs a single central control processor to operate the vehicles and does not consider how to avoid possible interference between the vehicles.

Thus, the above libraries are vulnerable to the failure of the library controller or to the failure of one of the pickers, and the library effectiveness is reduced by the need to adjust the operation of the pickers because of the presence of the zones, and further reduced by-the need to sense the situations requiring adjustment of the zones.

SUMMARY OF THE INVENTION

An object of the present invention is to increase the effectiveness of a library having multiple pickers.

Disclosed are multiple intelligent pickers with dynamic routing for an automated data storage library. Media storage slots for storing data storage media and a plurality of read/write stations are arranged so as to be accessible to the plurality of the pickers. A library controller receives move commands from an attached host to move media amongst the media storage slots and the read/write stations. The library controller identifies the start and end locations of the received move job, and places the move job in a job queue.

At a high level, a host will provide an identifier of the data that is to be moved, such as the volume serial number (VOLSER) of the data, and the controller or library manager determines from tables the data storage media containing the data and the storage slot holding that media. At a low level, a host will provide the identifier of the storage slot holding media with the desired data.

Each intelligent picker dynamically routes itself. Each picker comprises at least one gripper for accessing and delivering media at the media storage slots and the read/write stations, and a picker processor.

The picker processor receives information over a communication link from other pickers describing a movement of another picker for a current move job of the other picker. Upon completion of a move job, the picker selects a move job from the job queue. The move job is selected if it has both the start and the end locations accessible by the picker and which avoid interference with the movement of the other picker. Upon selecting the move job, the picker processor determines a movement for the selected move job which avoids interference with the movement of the other picker.

In one embodiment, upon determining the movement, the picker processor communicates information describing the determined movement to the other picker(s) over the communication link, and upon communicating the movement, operates the picker to conduct the move job according to the processor determined movement. In this embodiment, the movement information comprises a movement profile having the start and end locations of the move, any intermediate location at which the picker will change direction, and a clock time at which the move job commences.

In an alternative embodiment, the movement information comprises the present location and vector of the picker, and the end locations of the move.

For the purpose of this invention, the communication between the pickers and with the job queue may be hardwired or may be wireless.

For a fuller understanding of the present invention, reference should be made to the following detailed description taken in conjunction with the accompanying drawings.

BRIEF DESCRIPTION OF THE DRAWINGS

FIGS. 2A and 2B are illustrations of sequences of picker positions of the pickers of the library of FIG. 1;

FIG. 3 is an illustration of the interference areas of the pickers of the library of FIG. 1;

FIG. 4 is an illustration of a job queue in the library controller of the library of FIG. 1;

FIG. 5 is an illustration of a table of movement profiles for current jobs of pickers of the library of FIG. 1;

FIGS. 6A and 6B are graphs of, respectively, starting and stopping movements of a picker of the library of FIG. 1 in the X direction;

FIGS. 7A and 7B are graphs of, respectively, starting and stopping movements of a picker gripper of the library of FIG. 1 in the Y direction;

FIGS. 8A and 8B are illustrations of tables of, respectively, X vs. T and Y vs. T movement profiles of the pickers of the library of FIG. 1;

FIG. 15 is an illustration of a table of present movement information of pickers of the library of FIG. 1.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

As discussed above, conventional automated data storage libraries with dual pickers avoid collisions by assigning each picker to a zone within the library. These zones are separated by a zone boundary area, which prevents the pickers from interfering with each other. When a picker requires access to an area outside of its zone, the zone boundary is either moved or the second picker is moved into an out of the way position.

Figure 1:
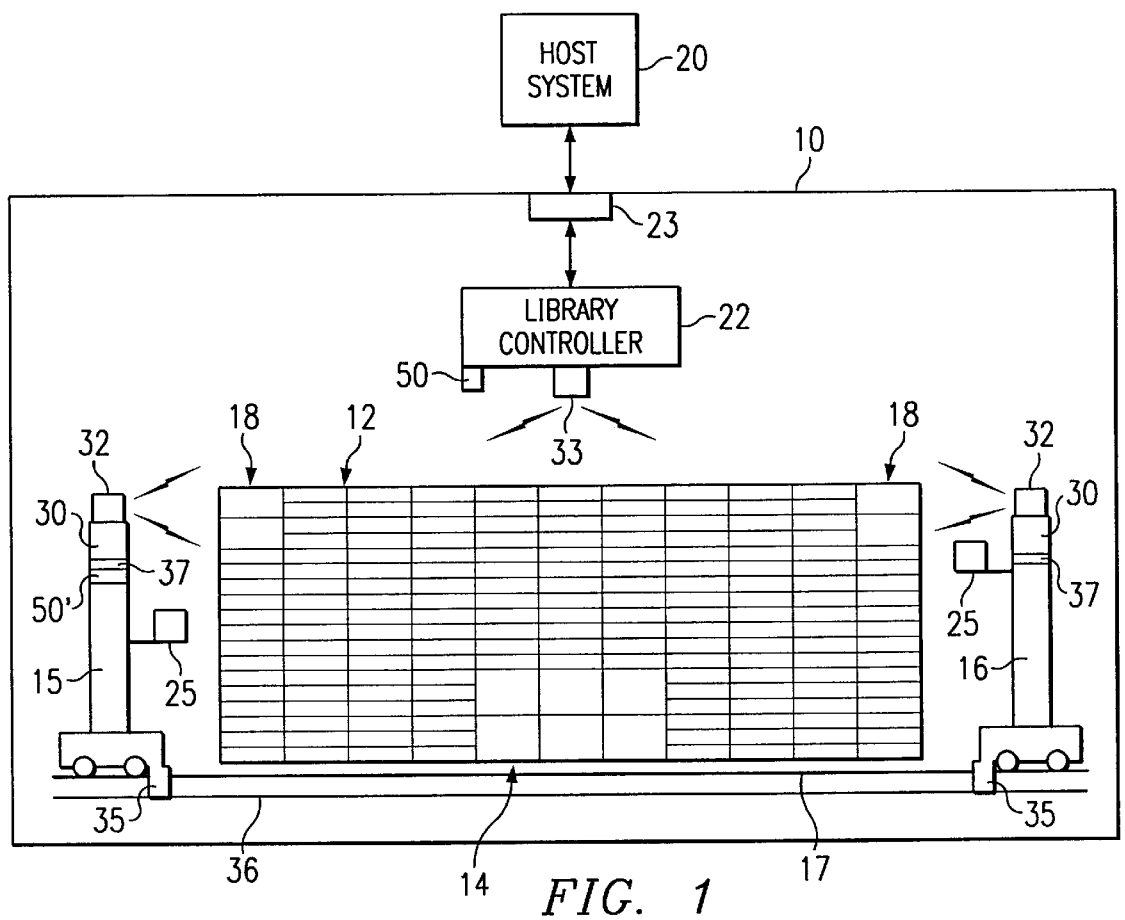
FIG. 1 is a diagrammatic representation of an automated data storage library in accordance with the present invention, employing dual pickers, and coupled to a host system.

FIG. 1 illustrates an embodiment of an automated data storage library 10 in accordance with the present invention. The present invention is equally applicable to automated data storage libraries which store any type of portable data storage media. An example of an-automated data storage library in which the present invention may be implemented is the IBM 3494 Tape Library Dataserver with dual pickers. The data storage media may encompass a variety of media, such as magnetic tape cartridges (in the IBM 3494 Tape Library Dataserver), magnetic tape cassettes, optical tape cartridges, or optical disk cartridges of various types. The data storage media are stored in storage slots 12, and may comprise storage for either homogenous or mixed media. In a typical data storage library, the storage slots 12 are arranged in a planar configuration, either flat or cylindrical. The typical data storage media stores a large amount of data, and the media is termed a volume or a physical volume.

The data storage library includes a plurality of read/write stations 14 having data storage drives which load the media into the drive, bring the media up to speed by driving tape between reels or rotating an optical disk, and read data from or write data to the media.

A plurality of pickers, or robot accessors, 15 and 16, are provided, which access portable data storage media from the media storage slots 12 and deliver the accessed media to a data storage drive at a read/write station 14 for reading and/or writing data on the accessed media. The pickers may move on a single rail 17, or on multiple parallel rails. Multiple rails change the interference patterns significantly as is understood by those of skill in the art. The media are returned to the same or different data storage slots 12, and are moved amongst the data storage slots and input/output slots 18 at which the media may be removed from or added to the library.

Typically, the commands to move the data storage media originate with a requesting host system 20 which sends the commands to the library controller 22 at a library interface 23. The library controller 22 comprises at least one programmable computer processor, such as an IBM RS/6000.

At a high level, the host system typically requests retrieval of a particular volume, e.g., by its VOLSER, and loading of that volume into a selected data storage drive. The library controller comprises a conventional library manager which has tables relating the volumes to the storage slots 12. Thus, the library controller determines the storage slot having the requested volume. Upon completion of the activity regarding the volume, the volume is typically returned to the storage slots 12, but not necessarily at the same location from which it was retrieved. Additionally, the data storage media may be moved from a read/write station or from a storage slot to an input/output slot.

At a low level, the host system tracks the data volumes stored in the library, and therefore requests retrieval of a particular volume, giving the exact storage slot and identifying the selected data storage drive.

In a conventional data storage library, each picker includes a gripper 25, a robot servo processor, and a plurality of servo motors operated by the servo processor to move the picker in the X direction, to move the gripper in the Y direction, and to operate the gripper to access and to release cartridges. In an optical library, the gripper may also rotate the optical disk to present the opposite side of the disk to the read/write station, as well as other functions.

In accordance with the present invention, the pickers are each additionally provided with a processor 30, such as a microcontroller on a chip with storage, e.g., an Intel microcontroller, and the processor is coupled to a wireless picker to picker communication link 32. The wireless communication link 32 is preferably an infrared transceiver, for example, such as employed in the automated data storage library of coassigned U.S. Pat. No. 5,303,214 to communicate between a bar code reader and library controller, but may alternatively comprise the wireless communication link of coassigned U.S. Pat. No. 5,395,199 to communicate between a library controller and wireless vehicles.

The library controller 22 may be located in the frame of the library and provided with a wireless central communication link 33. Thus, the pickers 15 and 16 communicate with each other employing the wireless communication link 32, and each communicates with the central library controller using the communication link 32 and the central library controller communication link 33. A central job queue 50 is provided by the library controller 22, for example, in memory or in a database of the controller.

Alternatively, the central job queue may be mounted in or provided as part of one of the pickers 15 or 16, shown as 50' at picker 15. The central job queue may then employ the picker communication link 32 and wireless communication link 33 to communicate with the library controller 22. Thus, communication link 32 is also the wireless central communication link.

The library controller and each picker processor is provided with an operating system and application programs for operating in accordance with the present invention. The application programs may comprise a computer program product, comprising computer readable program code. The computer program product may be supplied electronically, as from a network or the host system at the communications interface 23 and supplied to the picker processors over communication link 33 and 32. Alternatively, the computer program product may be supplied at an I/O station of the respective processor or at a data storage library data read/write station 14 from storage media which stores executable computer instructions, and comprises an article of manufacture. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions.

The processor 30 of each of the pickers 15 and 16 is additionally coupled to the robot servo processor of the respective picker, and operates the robot servo processor. Thus, the picker processor 30 operates the servo processor to move the picker in the X direction along rail or rails 17, to move the picker gripper 25 in the Y direction, and to operate the gripper.

Additionally, each picker is provided with a power distribution system and power pickup, such as shoe or slider 35 which receives power from a rail 36. Alternatively, the power system may receive power by means of microwave transmission.

Figure 2A:
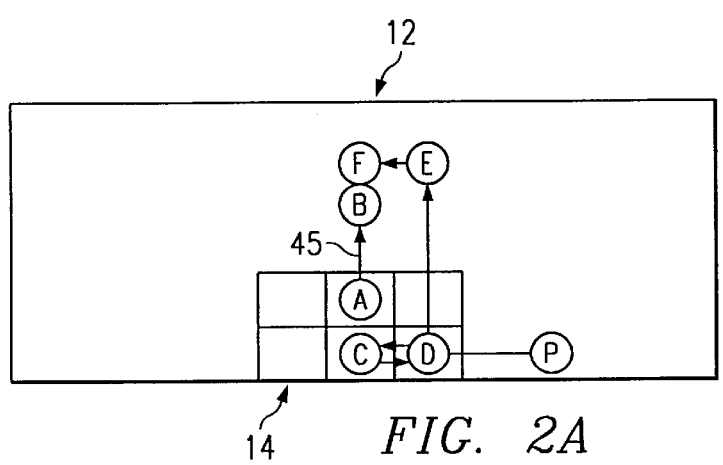

Referring additionally to FIGS. 2A, 2B and 3, the library controller 22 receives input commands for jobs to move media amongst the media storage slots and the read/write stations. As discussed above, the host may supply the start and end locations of the move, or the library controller identifies the start and end locations of the received move jobs, and the controller places the move jobs in the central job queue 50. In the example of FIG. 2A, the library may identify a move job for moving a data storage media from a read/write station 14 at location "C" to a storage slot 12 at location "F".

In accordance with the present invention, the central job queue 50 or 50' is accessible to all of the intelligent pickers for dynamic routing of the pickers by the pickers. The picker processor 30 for each picker stores information received from the other pickers over the picker to picker communication link 32, the received information describing a movement for the current move job of each of the other pickers. The movement information is stored in a data base 37, which may comprise a non-volatile memory or a micro-drive. In the example of FIG. 2A, the current move job for picker 15 may comprise moving a data storage media from a read/write station 14 at location "A" to a storage slot 12 at location "B". Upon completion of a previous move job (not shown), the picker processor 30 of picker 16 communicates with the library controller 22 with the wireless communication link 32 and 33, selecting a new move job from the job queue 50.

In accordance with the present invention, the picker processor for picker 16 will select the next move job in a priority sequence having both the start location "C" and the end location "F" accessible by the picker and which avoids interference with the stored movement of the other picker 15.

The area of occupancy and potential interference, in the example of FIG. 3, is the area occupied by or behind the other picker, and is illustrated by the shaded area 40 for picker 15 cow and shaded area 41 for picker 16. The areas of occupancy and potential interference move in the X direction as the respective pickers are moved in the X direction. The protrusions 42 and 43 for the respective areas of potential interference represent the respective grippers 25, and move in the Y direction as the respective grippers are moved in the Y direction. In FIG. 3, picker 15 is shown in position "A" of FIG. 2A, and picker 16 is shown in position "P" of FIG. 2A.

In accordance with one embodiment of the present invention, the movement information comprises a movement profile. The movement profile includes the start and end locations of the job, and includes any intermediate location at which the picker will change direction. The movement profile also includes the clock time at which the move job commences or commenced.

In the example of FIG. 3, the pickers extend into the adjacent columns and occupy three storage cells in height. Other arrangements are understood by those of skill in the art.

As illustrated with reference to the area of interference 40 for the picker 15 outlined in FIG. 3, and referencing FIG. 2A, the start location "C" and the end location "F" are outside the area of potential interference with the picker 15 as it moves its gripper from location "A" to location "B" along path 45, and the picker processor 30 of picker 16 may initially select the move job.

Upon selecting the move job, the picker processor 30 determines the movement profile for the selected move job which avoids interference with the stored movement profiles of the other pickers. In the example of FIG. 2A, picker 16 is at a beginning position "P" different from the start location "C", and the picker processor includes pre positioning the picker from the beginning position to the start location in the movement profile for the picker, which can be done without interference with picker 15.

In order to avoid the area of interference in moving from location "C" to location "F", picker 16 must not move directly between the points. Instead, picker 16 must move outside the area of interference of the gripper (shown as 42 in FIG. 3) of picker 15 as it moves from location "A" to location "B". Therefore, the picker processor 30 of picker 16 determines that a path having intermediate locations "D" and "E" will avoid interference between the pickers. Thus, the picker processor for picker 16 adds to the prepositioning move and any wait time, e.g., for unloading data storage media from the data storage drive and loading it into the picker, at the drive 14 at location "C", a first move from location "C" to intermediate location "D", a second move from location "D" to intermediate location "E", and a third move from location "E" to end location "F". Each of these moves represents a move profile determined by the picker processor, and the moves are accumulated and communicated over wireless link 32 to the picker processor 30 of picker 15. The total movement profile is then stored by processor 30 to be employed as the stored profile to select the next job by picker 15 upon completion of its move from location "A" to location "B".

FIG. 2B illustrates another combination of move operations. Picker 15 is conducting a move from drive 14 location "J" to storage slot 12 location "K". Subsequently, picker 16 completes its previous move operation, and is at location "P", and selects the next move job from the library controller queue. One of the move jobs in the received list is a move from location "L" to location "M". When considering the entire movement profile of picker 15, picker 16 will interfere with the move profile in attempting to access location "L".

In accordance with one embodiment of the present invention, the pickers exchange movement information which comprises a movement profile detailing a picker's current movements. A picker processor selects a move job based on avoiding interference with another picker for the remainder of its movement in accordance with the movement profile. The movement of a picker can be verified by regularly transmitted "heartbeat" location movement information from the picker. The "heartbeat" information may be transmitted, for example, at half second intervals.

In accordance with another embodiment of the present invention, the movement information comprises vector information transmitted from the other picker, preferably at regular intervals, and comprising expanded "heartbeat" information, over the picker to picker communication link 32. The present picker similarly provides vector "heartbeat" movement information at regular intervals, e.g., every half second, to the other pickers over the picker to picker communication link 32 and to the controller over its communication link 33.

The movement information provided in the vector embodiment comprises at least the present location and vector, including the speed and direction, all of which may be represented in terms of X and Y dimensions. The time of the movement information may also be provided. Additionally, the end location of the job or move may be provided so as to provide a limit to any projection of a move.

Thus, in either embodiment, and referring to FIG. 2B, at the current clock time, picker 15 is at location "J", a location allowing picker 16 access to drive 14 location "L", and the movement profile and the movement information indicate that the other picker 15 is moving toward location "K". Start location "L" and end location "M" are therefore both accessible by picker 16 without interference, and the picker processor selects the move job. The selected move job allows direct movement between the initial position "P" and the start location "L", and direct movement between the start location "L" and the end location "M". Thus, the picker processor for picker 16 adds to the prepositioning move and any wait time at the drive 14, for example, for loading the picker gripper, at location "L", a direct move from start location "L" to end location "M".

In accordance with the movement profile embodiment, the moves represent a movement profile determined by the picker processor, and the moves are accumulated to a movement profile and communicated over wireless link 32 to the picker processor 30 of picker 15. The total movement profile is then stored by processor 30 to be employed as the stored profile to select the next job by picker 15 upon completion of its move from location "J" to location "K".

In accordance with the vector movement information embodiment, the moves are determined by the picker processor 30 of picker 16, but only the periodic "heartbeat" movement information is communicated over wireless link 32 to the picker processor 30 of picker 16. The picker processor of picker 16 will thus be aware of each move or wait time of picker 15 as it occurs, and selects a move job based on the projected movement of picker 15.

The major difference between the movement profile embodiment and the vector embodiment is, in the movement profile embodiment, that the pickers follow a predetermined path, and, in the vector embodiment, each picker is at an X, Y location with a speed vector and the capability to change the path as needed.

In the vector embodiment, it is necessary to avoid allowing the pickers to get into a loop. Thus, one of the pickers has priority and the other picker must change its path. As one example, the picker that started its present move job first has priority. As another example, a selected one of the pickers always has priority.

The subsequently received "heartbeat" movement information is employed by the picker processor 30 to assess whether the then present movement of the other picker has changed to the extent that it will interfere with movement of the receiving picker in conducting its selected move job.

In the movement profile embodiment, if a movement profile has been received by a picker processor, the present location of the other picker is compared to the expected current location of the picker as determined from the profile. The present location may be requested from the other picker or derived from the "heartbeat" information received from the other picker, received over the picker to picker communication link. The information includes both the measured location of the picker and the clock time of the measurement. If the expected current determined location differs from the received present location, the other picker is not following the profile. Hence, the receiving picker processor compares the locations, determines the difference in location, and, upon that difference exceeding a predetermined threshold, the receiving picker processor aborts the move job. This will stop the picker so that there is less likelihood of interference with the other picker. An example of a predetermined threshold is a difference in the expected current and received present locations of half a storage slot height or width. The picker that is not in the expected location may, for example, be running slower than expected due to unexpected friction. Upon abortion of the job, the receiving picker processor may send a message to the library controller 22 over the controller wireless link 33 indicating the error. The controller may then command the other picker to move to a garage and/or initiate an error detection procedure.

In the vector movement information embodiment, subsequently received "heartbeat" information from the other picker is employed by the receiving picker processor 30, which again determines the current and projected locations of the other picker. Then, the picker processor determines whether the movement of the receiving picker potentially interferes with the current and projected locations of the other picker. If potential interference exists, the receiving picker processor 30 discontinues the selected move job of the receiving picker. Since the receiving picker has no profile to compare with the location or movement of the other picker, there is no error. For example, a picker will change speed during acceleration or deceleration, and may change direction at an intermediate point. Thus, once the other picker has moved out of the way, the receiving picker may resume the move job.

A picker processor 30 may determine the X and Y velocities of the picker gripper 25 by reading the servo tachometers of the picker servo motors. The present location may be determined by measuring the velocity and time moved from a previous location. The locations may be verified and measured by reading identifiers, such as bar coded tags, at various locations in the library, etc., as are known in the art.

The library controller 30 may monitor the "heartbeat" information from each of the pickers over the wireless link 33. If no "heartbeat" information is received from one of the pickers, the library controller will begin an error procedure which may comprise commands to stop the pickers or to stop the supply of power to the pickers to insure that no interference occurs.

FIG. 4 illustrates an exemplary central job queue 50 in the library controller 22 of FIG. 1. As discussed above, the central job queue alternatively may be located at one of the pickers 15 or 16. The library controller receives input commands for jobs to move media amongst the media storage slots, input/output slots 18, and the read/write stations. The library controller 22 identifies the start and end locations of the received move jobs, and places the move jobs in the job queue 50. The exemplary job queue comprises a listing of the move jobs to be conducted, and includes the job identification 51, the priority of the job 52, the job type 53, which includes, for example, whether the job is a move job to move a data storage media between storage slots, a move job to move a data storage media from a storage slot to a data storage drive, or a move job to move a data storage media from a data storage drive to a storage slot 12 or an input/output slot 18. Typically, the job queue is organized by priority, with the highest priority jobs at the top of the queue. The queue also includes a identification 54 of the requesting host, the identification (VOLSER) 55 of the data storage media, and the identification of the starting location 56 and ending location 57. Preferably, the starting and ending locations are each identified by means of the X and Y coordinates within the library 10.

FIG. 5 is an illustration of an embodiment of a table 60 of movement profiles of a picker processor 30 of one of the pickers 15 or 16 for current move jobs of the other picker in the library. Table 60 is only employed in the movement profile embodiment. The movement profile table 60 comprises the picker identification 61, which may be omitted in the instant example where only one other picker is in the library. The job identifier 62 and job type 63, as discussed above, are included. The initial position 64 of the other picker is stored, together with the locations of the move by the other picker, specifically, the start location and time 65, any intermediate locations 66 and 67, and the end location 68. Lastly, the other picker provides its total movement profile, or sequence of profiles 69, which are stored in the table.

FIGS. 6A and 6B are graphs of, respectively, starting and stopping movements of a picker 15 or 16 in the X direction, and FIGS. 7A and 7B are graphs of, respectively, starting and stopping movements a picker gripper 25 of the picker 15 or 16 in the Y direction. The graphs illustrate the information used to establish the movement profiles of table 60 in FIG. 5. The graph 70 of FIG. 6A illustrates the acceleration of the picker from a stop and then five different constant speeds. Thus, the picker processor may select a less than maximum speed to drive the picker in the X direction if needed to avoid interference with the other picker. Also, the acceleration portion of the curve may be different if the picker is unloaded or loaded, and may be different if loaded with a magnetic tape cartridge or loaded with an optical disk cartridge. The graph 71 of FIG. 6B illustrates the deceleration of the picker in the X direction as it is stopped. The deceleration is illustrated as beginning at each of the five maximum speeds depicted in graph 70 FIG. 6A. Again, the deceleration may differ between instances when the picker is unloaded, or loaded with a magnetic tape cartridge, or loaded with an optical disk cartridge.

The graph 72 of FIG. 7A illustrates the acceleration of the picker gripper 25 of the pickers from a stop in the Y direction and then five different top speeds as above. Since the picker gripper is only a part of the picker mechanism, the acceleration differs substantially between the unloaded condition and loaded condition, and may differ between loaded with a magnetic tape cartridge as compared to loaded with an optical disk cartridge. The deceleration of the picker gripper 25 is illustrated by graph 73 in FIG. 7B. Again, the deceleration is from each of the five maximum speeds shown in graph 72 of FIG. 7A.

Each of the graphs of FIGS. 6A, 6B, 7A and 7B may be represented as move profiles as a series of X or Y distance versus time (T) points, as represented by the profile tables 76 and 77 of FIGS. 8A and BB. Alternatively, the graphs of FIGS. 6A, 6B, 7A and 7B may be represented as move profiles as acceleration, deceleration, and velocity equations. In accordance with the present invention, the various profiles of the graphs are stored by each picker processor, and are accessible by a profile identification 78 and 79. In the embodiment of FIGS. 8A and 8B, the profiles comprise tables of X direction locations, Y direction locations, and timing of the locations. As depicted, the tables are organized into loaded and unloaded profiles (having different accelerations/decelerations) and by the selected maximum speed. The loaded profiles indicate the acceleration or deceleration of the picker when loaded with a cartridge, and the unloaded profiles are when the picker is empty. Additionally, the profiles may be organized by the length of distance traveled. Alternatively, the picker processor may only utilize the portion of the profile for the appropriate length. For example, in a short move, the maximum speed may not be reached.

The tables 76 and 77 of FIGS. 8A and 8B may be drawn to represent the separate graphs of FIGS. 6A, 6B, 7A and 7B, and the profile for a given move assembled by combining the portion of the move from each of the separate X acceleration and X deceleration, and Y acceleration and Y deceleration profiles. Alternatively, the tables 76 and 77 of FIGS. 8A and 8B may be much more extensive and include a profile for each maximum speed and each possible total length of move, including both acceleration and deceleration, and a single X profile and single Y profile is identified for each move.

The profiles of the various moves are then assembled together and the identifications of the moves are transmitted by the picker processor that will make the move. The receiving picker processor will store the identifications in column 69 of the table 60 and will use the identifications 78 and 79 to look up the profiles in its tables 76 and 77.

Thus, the picker processor has an accurate representation of the current move of the other picker.

Table 80 of FIG. 15 represents the received vector movement information of one picker processor 30 that has been received from one or more other pickers over the picker to picker wireless communication link 32. Table 80 is only employed in the vector embodiment. As one example, the movement information is the present movement information or "heartbeat" information, which may include the picker identification 81 that may be omitted if only one other picker is in the library, but that is important to the library controller 22 in determining whether the "heartbeat" information is being received from each of the pickers. The present movement information preferably also includes the present location of the picker, such as in the X dimension 82 and Y dimension 83. Additionally, the present vector of the picker is provided, such as by means of the velocities in X and Y directions. This provides both the direction and speed of the picker. As discussed above, the transmitting picker processor reads the velocities and derives the locations from the picker servo motor tachometers. So that the receiving picker may limit the projected locations of the other picker, it is also preferable that the other picker provide the end location of its present move job 86. Not necessary, but a further error check may comprise that the clock time 87 of the present location 82,83 and vector 84,85. Thus, if the transmission and/or receipt of the movement information is delayed, the receiving picker processor can adjust the received information to compensate.

The "heartbeat" information for the movement information embodiment requires the current location of the picker so that the receiving picker is able to compare the current location of the transmitting picker to the location expected from the movement profile. If the current location differs from the expected location, there is an error. To insure that the "heartbeat" is actually the current information, a clock time may also be transmitted.

Figure 9:
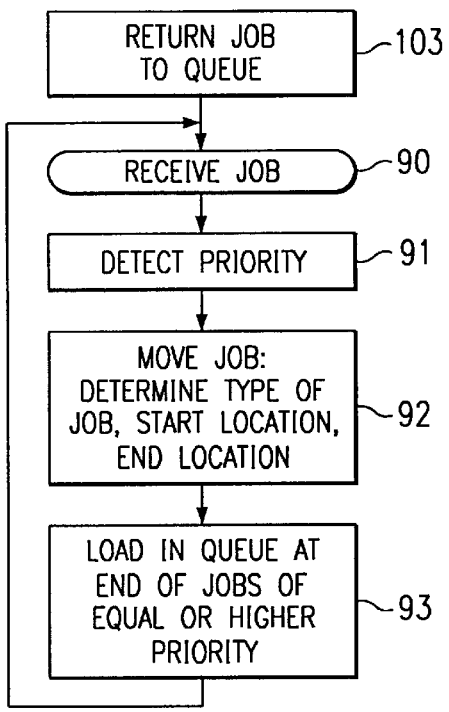
FIG. 9 is a flow chart depicting the method for receiving jobs to move cartridges in the library of FIG. 1.

FIG. 9 illustrates the process of the library controller 22 of FIG. 1 for receiving an input command to conduct a move job from the host, beginning at step 90. The host command may be a request to access a data storage volume from a storage slot 12 and mount it on a data storage drive 14 or export the data storage volume at an I/O port 18, or to import a data storage volume from an I/O port 18 or return a data storage volume located in a data storage drive 14 to a storage slot 12. The library controller determines the move job that is required. In step 91, the library controller 22 detects or determines the priority of the received job. If the job is a move job for moving media amongst the media storage slots and the read/write stations, the library controller 22, in step 92, identifies the type of job, the identifier of the media to be moved, and the start and end locations of the received move job. In step 93, the library controller loads a listing of the received job in the central job queue 50 of FIG. 4 at the end of the jobs having equal or higher priority. In this manner, the highest priority jobs are at the top of the queue.

Figure 10:
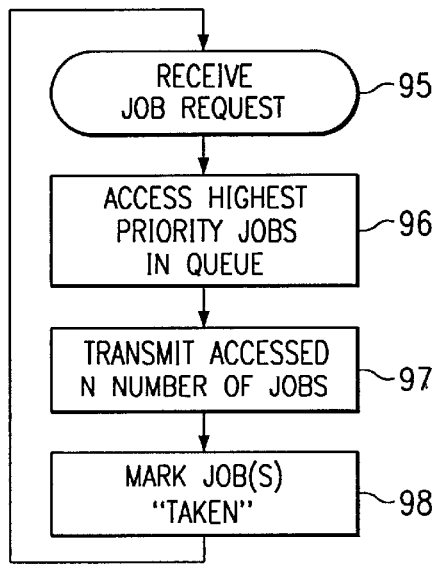
FIG. 10 is a flow chart of the library controller of the library of FIG. 1 receiving a job request from a picker in accordance with the method of the present invention.

FIG. 10 illustrates an embodiment of the present invention of the central job queue 50, e.g., in the library controller 22, of FIG. 1 for providing requested jobs to a requesting picker processor 30 over wireless communication link 33 and 32. The picker processor, upon completion of a job, in step 95, requests a new job. In accordance with the present invention, the picker processor 30 for each picker stores movement information either describing a movement profile of table 60 of FIG. 5 and the start time for the current move job of each of the other pickers, or describing the present movement of each of the other pickers, and will select the next move job having both the start location and the end location accessible by the picker and which avoids interference with the stored movement profile or present movement of the other picker.

Thus, the library controller may either supply a group of highest priority jobs at one time for the picker processor to select from, or supply the highest priority job for review by the picker processor, and, if that job is rejected, supply the next highest priority job, etc. Step 96 comprises selecting the highest priority jobs in sequence, selecting a group of highest priority jobs, or selecting jobs of the same priority in an order which maximizes performance. In step 97, the library controller supplies the accessed "N" number of jobs over the wireless communication link 33, either sequentially or at one time. The library controller then, in step 98, sets a flag to mark the job or jobs as "taken" so that the move job(s) will not be transmitted to another picker. As an option, if a picker cannot perform a "taken" move job within a predetermined time or number of jobs, it may be returned to the queue.

Figure 11:
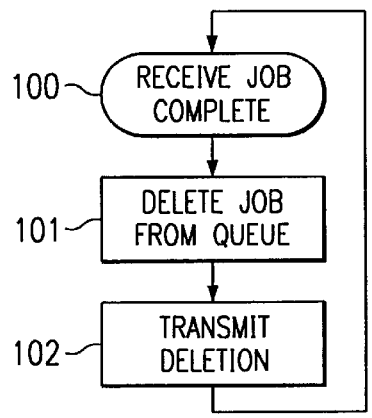
FIG. 11 is a flow chart of the library controller of the library of FIG. 1 receiving an indication that a job has been completed in accordance with the method of the present invention.

In step 100 of FIG. 11, a picker processor 30 of FIG. 1 sends a job complete signal to the library controller 22 over communication link 32 and 33. The library controller receives the signal, which includes an identification of the job, and, in step 101, the library controller deletes the job from the queue, and informs the host system that its commanded job has been completed. As an optional step the library controller then confirms the deletion to all of the picker processors by transmitting a confirmation in step 102. If the job is aborted or not completed, the job may be returned to the queue in step 103 of FIG. 9.

A key element in the present invention is that the library controller 22 no longer is in control of the operation of both of the pickers, and the pickers are no longer limited to specific zones of operation. Rather, the pickers are largely independent and make the selection of move jobs from a central job queue, and those jobs may overlap into areas that would formerly be restricted.

Figure 12A:
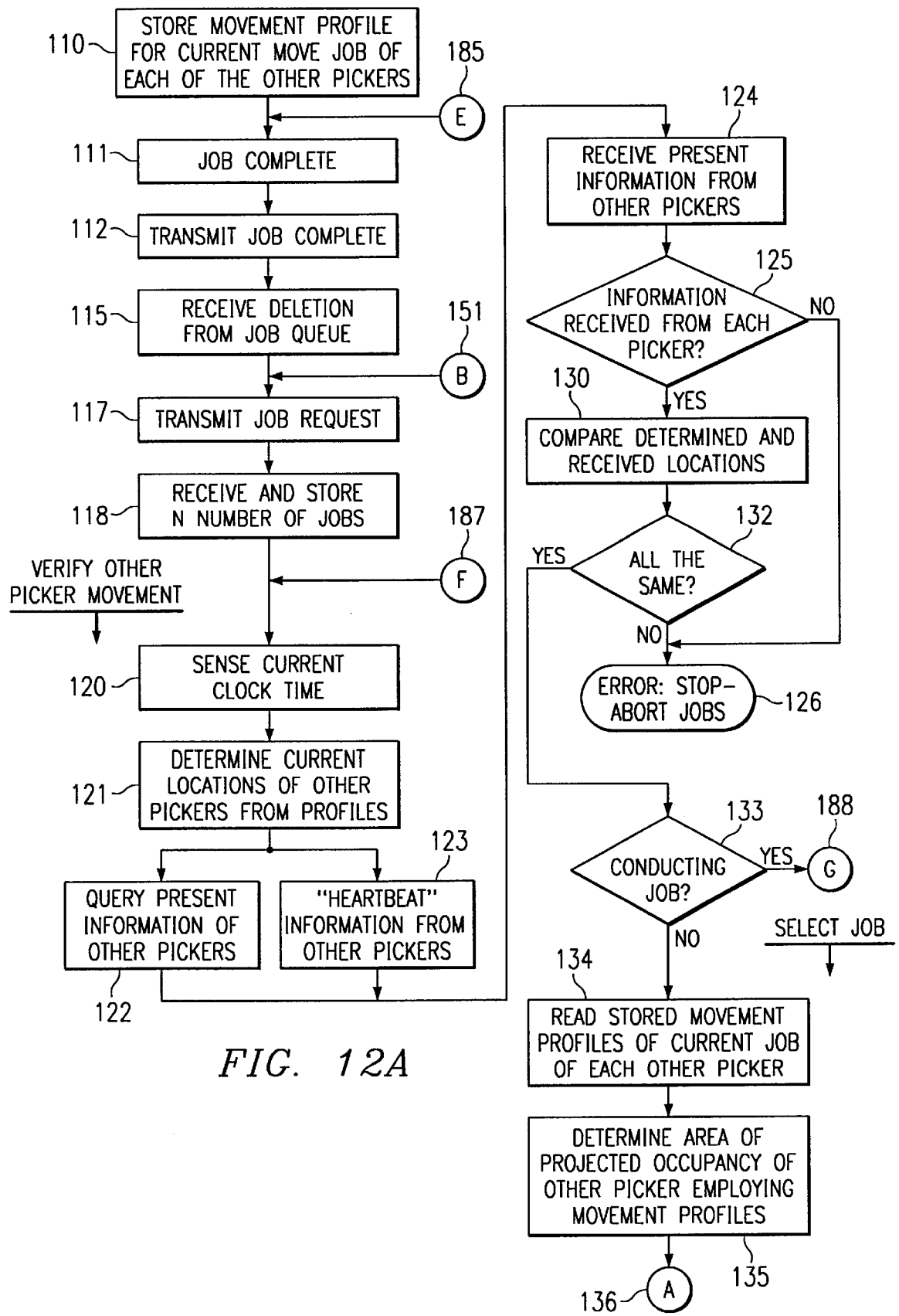
FIGS. 12A and 12B are a flow chart of an embodiment of the present invention employed in the library of FIG. 1.
Figure 12B:
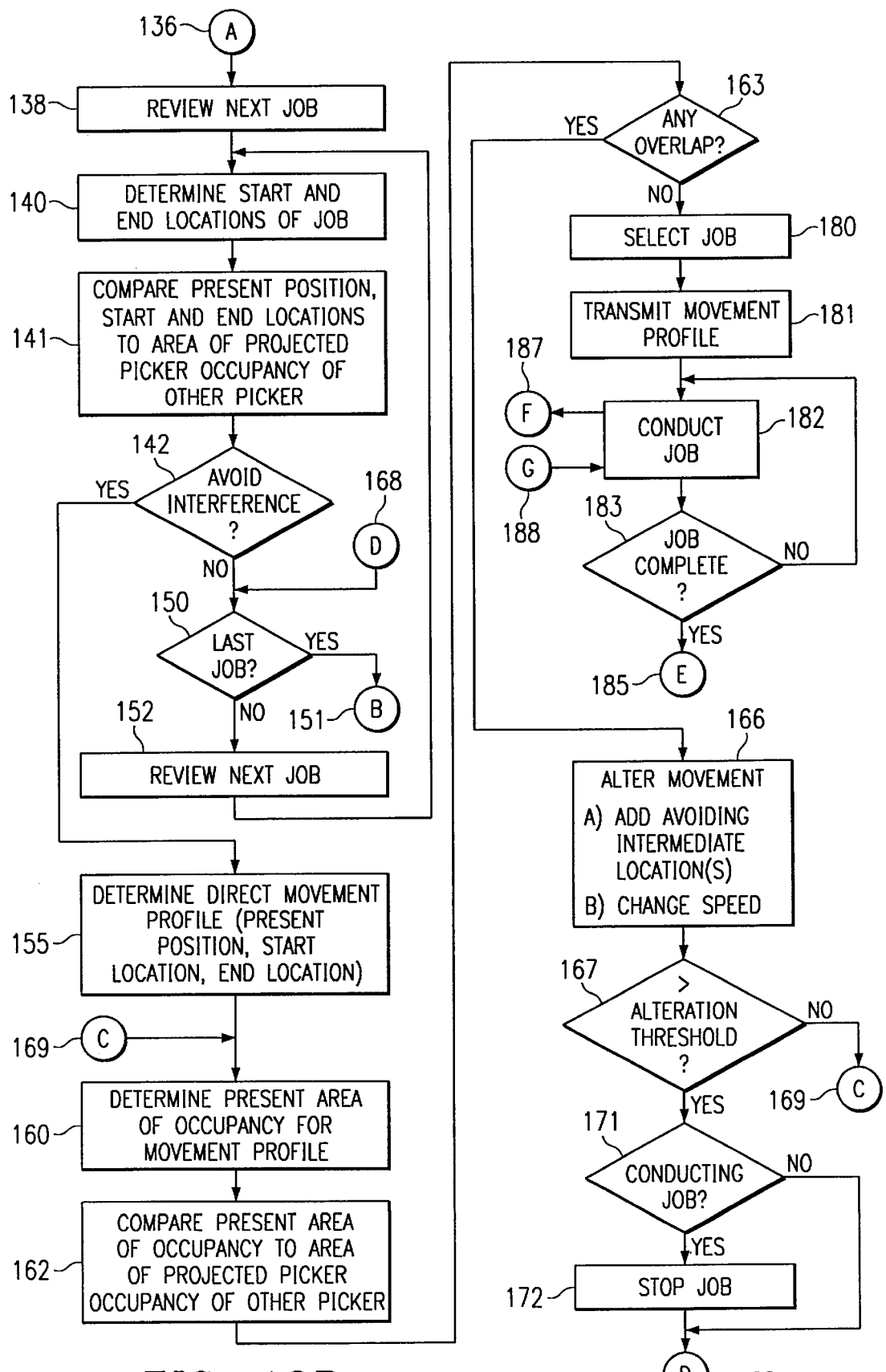

FIGS. 12A and 12B illustrate an example of the movement profile embodiment of the present invention for one picker processor to conduct the selection of jobs employing movement profiles received from another picker.

Step 110 represents the step discussed above wherein each picker processor 30 of FIG. 1 stores information describing a movement profile for the current move job of each of the other pickers in table 60 of FIG. 5. In the instant example of FIG. 1, picker processor 30 of picker 15 stores the current job movement profile for picker 16, and the picker processor 30 of picker 16 stores the current job movement profile for picker 15. Step 111 represents the completion of the immediately preceding job by the picker.

The picker processor 30, in step 112, transmits completion of the job to the central job queue 50, e.g., of the library controller 22 over the wireless communication link 32 and 33, and, as described with respect to FIG. 11, the library controller deletes the job from the queue, and transmits a confirmation over the communication link, the picker processor receiving the confirmation in step 115.

Move jobs are then requested for review by the picker. In step 117, the picker processor 30 transmits a job request to the central job queue 50 over wireless communication link 32 and 33. As described with respect to FIG. 10, the library controller accesses and transmits "N" jobs from the queue to the picker processor over communication link 33 and 32, the picker processor receiving the "N" jobs in step 118. If any of the previously received "N" jobs have not been completed, step 117 may instead select one of the remaining "N" jobs.

Next, the actual location(s) of the other picker(s) is (are) verified. In step 120, the picker processor senses the current clock time, and, in step 121, determines, from the job profile stored in table 60 of FIG. 5, the projected current location of the other picker. This is accomplished by utilizing the start time of the movement profile, and employing the current time to determine where along the profile the other picker is currently located. This may be accomplished through calculation or by lookup in the tables 76 and 77 of FIGS. 8A and 8B, employing the profile identifiers 78 and 79 and the time from the start time ($T_0$). For verification, the picker processor 30, in step 122, queries the present location, comprising the location and clock time of the location measurement, of the other picker over communication link 32, or, in step 123, the other picker transmits its "heartbeat" information over communication link 32, also comprising the location and clock time of the location measurement, the receiving picker receiving the present location and clock in step 124. In step 125, the picker processor determines whether the present movement information has been received from all of the other pickers, in the example of FIG. 1, the only other picker. If the present location is not received from the other picker, the actual location is therefore unknown, and the selecting picker processor cannot risk selecting a new move job without risking actual interference with the other picker. Hence, the situation is an error and step 126 stops and aborts the job selection.

If, however, the present location has been received from the other picker processor, "YES" in step 125, the picker processor, in step 130, compares the projected current location of the other picker from the determined step 121 and the received present location from step 124. Step 132 detects whether the determined and received locations are the same, or nearly the same and within a predetermined threshold distance. If not, "NO", the locations are different and this is again an error situation, leading to step 126 which aborts the jobs. If they are the same, "YES", the other picker is known to be in the correct location as defined in its movement profile.

Thus, the picker processor may begin the process of selecting, in accordance with the present invention, the next one of the move jobs from the job queue having both the start and the end locations accessible by the picker and which avoids interference with the stored movement profiles of the other pickers. Step 133 determines whether the picker is selecting a new job, as will be discussed. In step 134, the picker processor 30 reads the stored movement profiles of the current job of each of the other pickers from its movement profile table 60 of FIG. 5. In step 135, the processor employs the read profile to determine the area of projected occupancy and of possible interference of the other picker. This is accomplished by applying the movement profiles to the tables of FIGS. 8A and 8B and, adjusting the profiles for the current time, beginning at the current determined location of the other picker, and ignoring the past portions of the stored movement profile of the other picker. The process then continues with connector 136 to step 138.

In the instance where a plurality of jobs have been supplied, step 138 reviews or preliminarily examines the next one of the jobs for possible interference or selection, for example, the job having the highest priority. Alternatively, the highest priority job is predetermined by and received from the central job queue, or the job selection is based on performance. In step 140, the processor determines the start and end locations of the job being reviewed, for example, by their X and Y coordinates, and, in step 141, compares the present position of the picker, the start location, and the end location of the job with the area of projected occupancy and possible interference of the other picker, from step 135. In step 142, the processor determines from the comparison of step 141 whether there is any interference between the job being conducted by the other picker and the job being reviewed. If interference is not avoided, "NO", the job will not be selected and the next highest priority job will be reviewed. Hence, step 150 determines whether the last reviewed job was the last job in the group of "N" jobs received in step 118. If this is the last job, or, if only one job is received in step 118 at a time, "YES", connector 151 cycles back to step 117 to again transmit a job request to the library controller. If "NO", the last job has not been reviewed, the process, in step 152, determines the next highest priority job for review and cycles back to step 140.

If the reviewed job appears to avoid interference with the other picker, that job is preliminary selected, and step 155 comprises the process for determining the movement profile directly between the present position, the start location, and the end location without any intermediate locations. This is conducted by use of the tables of FIGS. 8A and 8B, or by calculation, as discussed above. Then, in step 160, the picker processor determines the present area of occupancy and potential interference for the movement profile determined in step 155. This is conducted by applying the area of the picker as illustrated in FIG. 3 to the movement profile. In step 162, the present area of occupancy and potential interference from step 160 is compared to the area of projected picker occupancy and interference of the other picker determined in step 135. Step 163 determines whether any interference exists between the movement profiles. If there is interference, "YES", the movement profile is then altered in step 166, either by adding an intermediate location which avoids the other picker such as illustrated in the example of FIG. 2A, or by altering the speed of one of the moves to less than the highest maximum speed to allow the other picker to move out of the way, such as illustrated in the example of FIG. 2B. Step 167 determines whether the proposed alteration exceeds a predetermined threshold of alterations, so that the move cannot be continually altered without being able to conduct the move. If the threshold has been met, "YES", the job will not be selected and connector 168 cycles back to step 150 to review another job. If the threshold has not been met, connector 169 cycles back to step 160 to determine the area of interference of the altered movement profile.

If step 163 determines that there is no overlap between the area of interference of the selected job and the current job of the other picker, the move job is formally selected in step 180 and the picker processor 30 transmits the movement profile over communication link 32 to the other picker in step 181. The picker processor of the other picker stores the movement profile in its movement profile table 60 of FIG. 5, overwriting the previous movement profile.

In step 182, the picker conducts the selected move job in accordance with the determined move profile, and step 183 indicates a wait state while the move job is conducted, cycling back to step 182 until the job is complete. Upon completion of the job, connector 185 indicates that the process cycles back to step 111 when the job is complete.

As discussed above, the "heartbeat" movement information of each picker may be monitored by the other pickers. Thus, connector 187 indicates that a picker processor 30, while conducting the selected move job, again, in steps 122, 123 and 124 of FIG. 12A, queries or receives the "heartbeat" movement information from the other pickers. Upon assurance in step 125 that all of the other pickers have provided the "heartbeat" information, the picker processor 30 updates the current locations of the other picker or pickers in step 121, and, in step 130, compares the determined and received locations. If step 132 indicates a mismatch, or if step 125 indicates that information was not received, step 126 indicates an error and the current move job is stopped and may be aborted. If step 132 indicates a match such that the other picker is following the profile, step 133 and connector 188 return to the current job 182.

Figure 13:
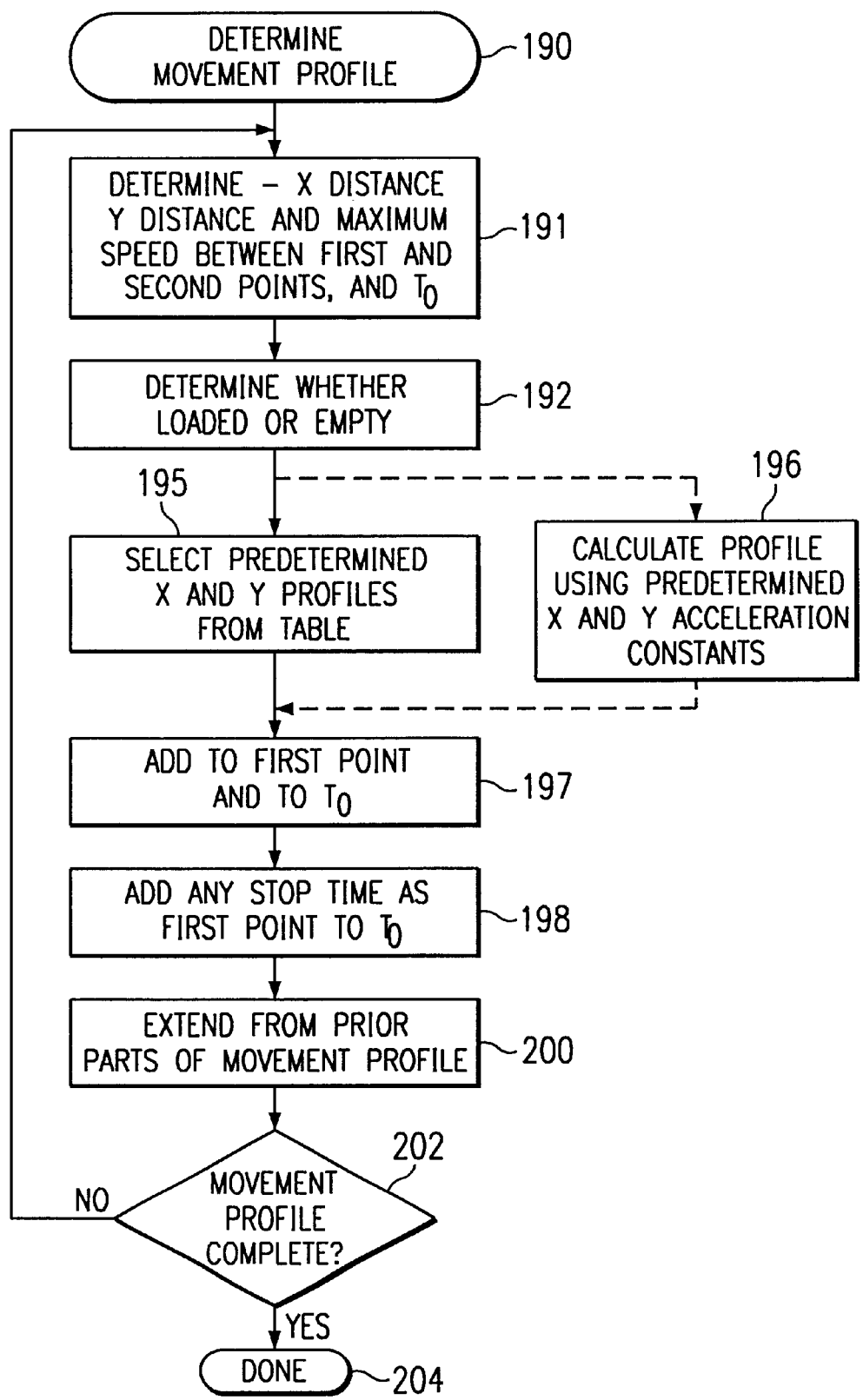
FIG. 13 is a flow chart of alternative embodiments of the determination of a movement profile for a picker in accordance with the method of FIGS. 12A and 12B.

FIG. 13 comprises an embodiment of steps 155 or 166 in FIG. 12B in determining a movement profile, beginning at step 190. Step 191 comprises determining the X distance and the Y distance from the previous position (1st point) to the next position (2nd point), and the maximum desired speed, together with the time of the beginning of the move ($T_0$), which may be the end time of the previous move. Step 192 determines whether the picker is to be loaded or empty during the move. Then, step 195 selects the appropriate X profile from table 76 of FIG. 8A and the appropriate Y profile from table 77 of FIG. 8B. Alternatively, the profile may be calculated in step 196 employing predetermined X and Y acceleration constants. In step 197, the selected or calculated profile is added to the 1st point and to $T_0$. In step 198, any stop time at the 1st point is added to $T_0$. Then, in step 200, the total move profile is extended from the prior parts of the move. Step 202 determines whether the end location has been reached as the result of step 200. If the complete move has not been assembled, "NO", the process cycles back to step 191 for the next leg of the move. If step 202 indicates that the complete move has been assembled, the process is completed in step 204.

Thus, the picker processor has selected the next one of the move jobs from the central job queue having both the start and the end locations accessible by the picker and which avoids interference with the stored movement profiles of the other pickers. Then, upon selecting the move job, the picker processor determined the movement profile for the selected move job which avoids interference with the stored movement profiles of the other pickers. Upon determining the movement profile, the picker processor communicated the determined movement profile to the other pickers over the communication link, and conducted the move job according to the processor determined movement profile.

Figure 16A:
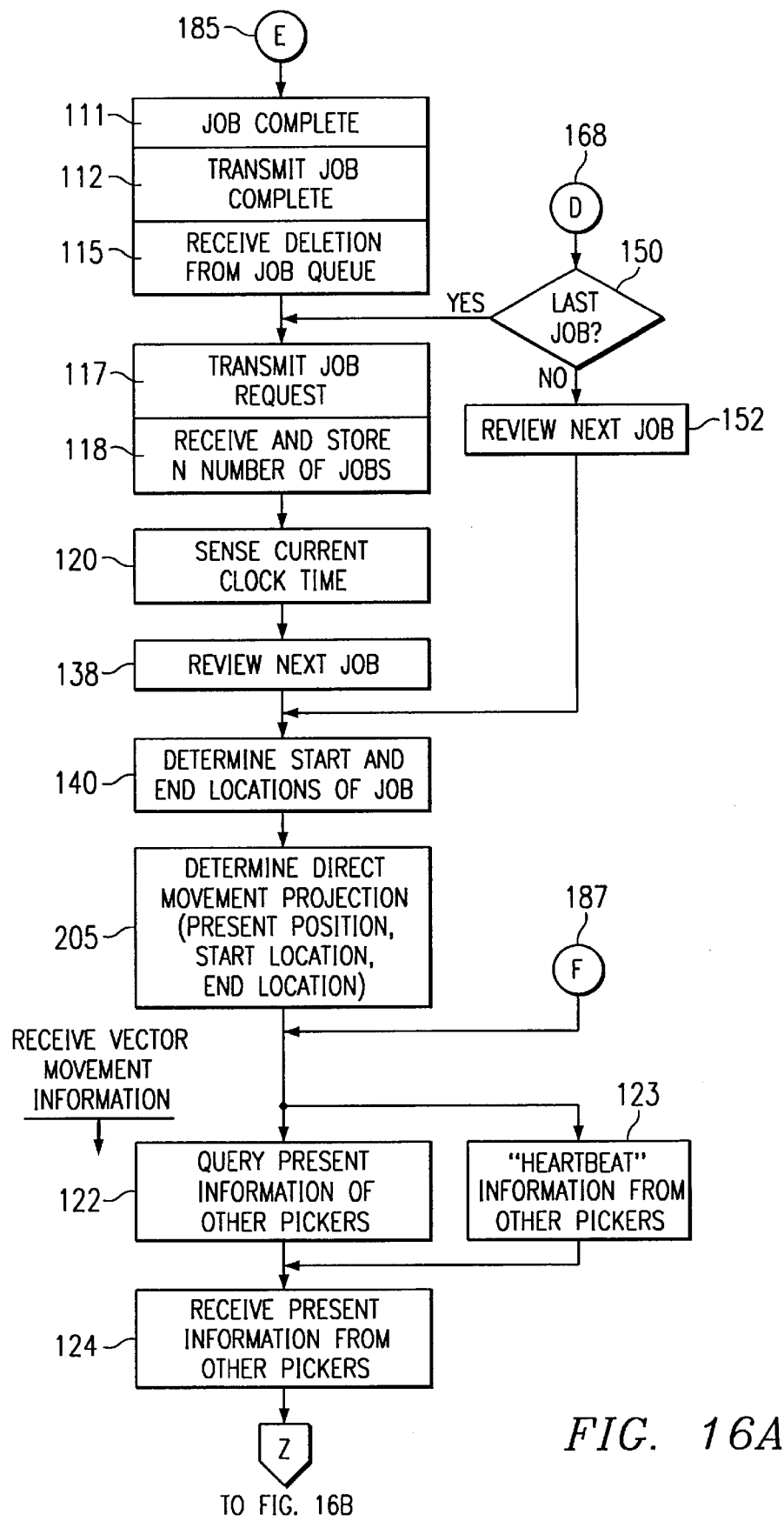
FIG. 16 is a flow chart of an alternative embodiment of the present invention employed in the library of FIG. 1.
Figure 16B:
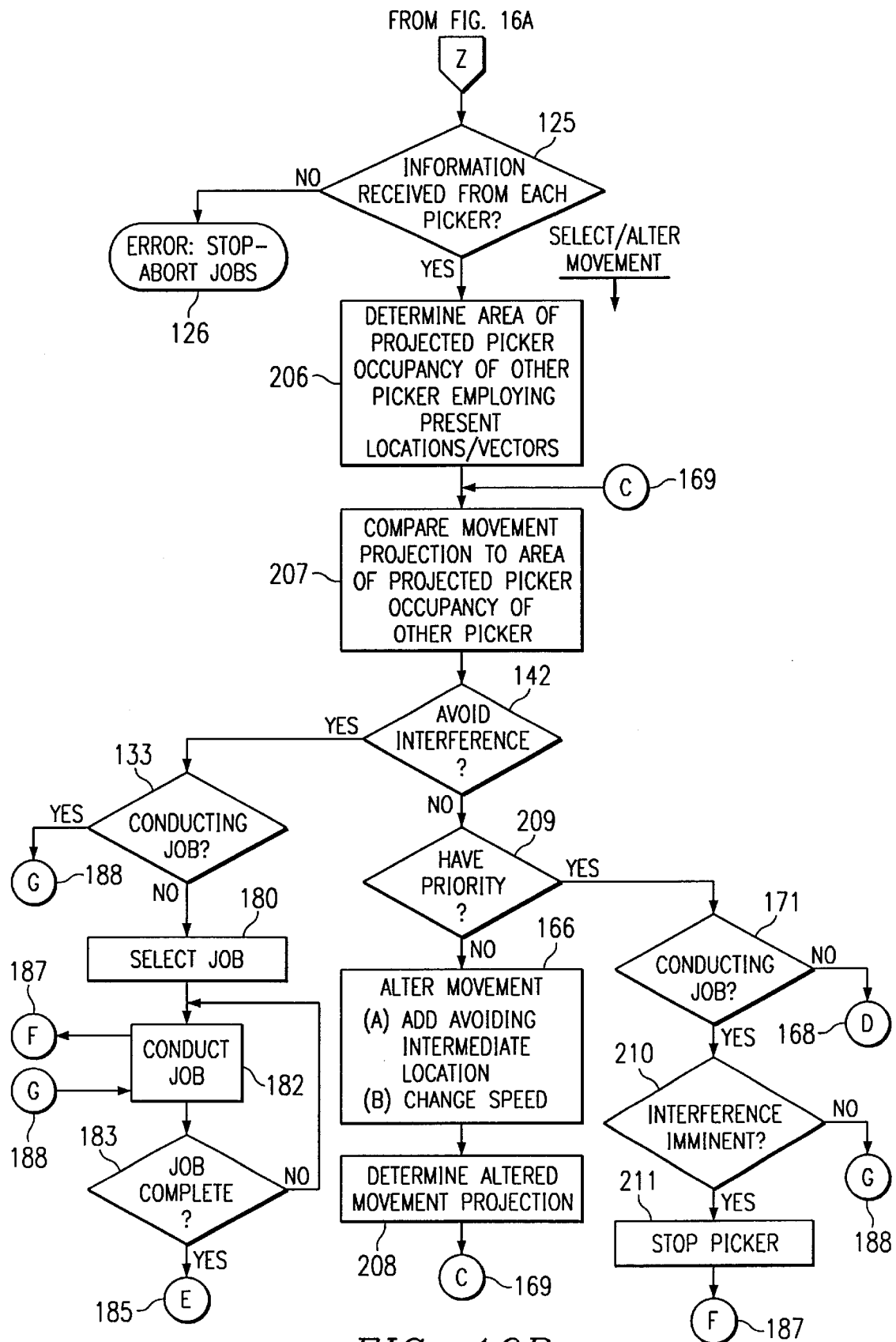

FIG. 16 illustrates an example of the vector embodiment of the present invention for one picker processor to conduct the selection of move jobs, and for conducting move jobs employing movement information received from another picker, the movement information including the location and vector of the other picker.

Many of the steps are the same as discussed with respect to FIGS. 12A and 12B, and, if so, use the same reference numbers and are not discussed in detail.

Upon completion of the immediately preceding job at step 111, the picker processor 30, in step 112, transmits completion of the job to the library controller 22 over the wireless communication link 32 and 33, and in step 115, the picker processor receives confirmation of deletion of the completed job. The picker processor 30, in step 117, transmits a job request to the central job queue 50, e.g. in the library controller 22, receiving "N" jobs in step 118. The current clock time is sensed in step 120 so as to update received vector information received from other pickers, as will be explained. The next job is preliminarily determined in step 138, and, in step 140, the receiving picker processor 30 determines the start and end locations of that job.

Step 205 relates to the vector embodiment and the picker processor 30 determines the projection of movement of the picker from its present position to the start location of the job and the movement to the end location of the job. Then, in the step 123, the other picker(s) transmits its most recent vector movement information, which may comprise the "heartbeat" information, over the picker to picker wireless communication link 32. Alternatively, the picker processor 30 may query the present location and vector of the other picker(s) in step 122. The information is received in step 124 and the picker processor stores the information in table 80 of FIG. 15. As discussed above, step 125 determines whether the present information has been received from each of the other pickers and, if not, stops and aborts the job selection in step 126.

If the present movement information has been received from the other picker(s), step 206 updates the information to the clock time sensed in step 120, and determines the projected area of occupancy of the picker. Specifically, the received movement information may be as described with respect to table 80 of FIG. 15 and comprise the location of the other picker at the provided clock time 87, together with a vector indicating the speed and direction of movement of the picker gripper at the provided clock time. If the provided clock time is earlier than the current clock time, the receiving picker processor 30 updates the location of the other picker along the vector to the current clock time sensed in step 120. Then, the picker processor projects the path of the other picker based on the updated location and the vector, limited by the ending location 86. Next, the picker processor determines the area of occupancy and potential interference for the other picker along the projected path. In step 207, the picker processor 30 compares the picker direct movement projection of step 205 to the other picker area of occupancy or potential interference of step 206.

If the comparison indicates that interference is avoided, "YES" in step 142, the preliminarily reviewed job of step 138 can be selected. First, step 133 determines that a job is not currently being conducted, as will be explained, and the processor selects the job in step 180 and conducts the job in step 182.

It is important to continuously monitor the other picker since only the last vector of the picker is known. The other picker may accelerate, decelerate, start, stop or change direction. Hence, connector 187 leads to either step 122 to query the other picker, or step 123 where the other picker sends "heartbeat" information which indicates the present location and vector of the other picker. Steps 124, 125 and 206 are again conducted to determine the updated area of projected occupancy or potential interference, employing the present location and vector of the other picker(s), and step 142 determines whether interference is still avoided. If so, step 133 indicates that the job is being conducted so that connector 188 returns to step 182 to continue conducting the job.

In either an original determination of interference, or while conducting a job, should step 142 indicate interference, it is important to insure that the pickers do not get into a loop where both pickers continue to alter movement indefinitely. As discussed above, one approach is to give one picker priority over the other(s), so that the priority picker continues its movement and the other picker(s) alter movement. Hence, the picker processor 30, in step 209, determines whether the picker has priority. If the picker does not have priority, step 166 alters the movement, either by adding an intermediate location which avoids the other picker, or by altering the speed of a move to less than the highest maximum speed to allow the other picker to move out of the way. As discussed above, the movement projection for the altered movement is determined in step 208. Then, connector 169 leads to step 207 for a comparison of the altered movement projection to the area of projected occupancy of the other picker, and interference is again tested in step 142.

If the picker has priority, any job can be continued. Thus, step 171 determines whether a job is being conducted. If so, step 210 comprises a safety factor, determining whether interference is imminent. If so, the picker is stopped in step 211 so as to temporarily discontinue the move job, and connector 187 cycles back to receive the vector movement information of the other picker(s) in step 122 or step 123, and in step 124. If interference is not imminent, "NO" in step 210, connector 188 allows the movement of the picker to continue while conducting the job in step 182. If step 171 indicates that no job is being conducted and a job was being reviewed, connector 168 leads back to step 150 to determine the next job to be reviewed.

Upon conducting a job, step 183 determines whether the job has been completed and, if not, "NO" the process cycles back to step 182. If the job was completed, connector 185 leads to steps 111–115 to delete the job from the job queue. As discussed above, step 117 either selects a remaining one of the previously received "N" jobs, or transmits a job request to the central job queue 50, e.g., in the library controller 22.

Thus, the pickers receive move jobs from the central job queue over a wireless communication link, and communicate with each other over the picker to picker wireless communication link 32, and are able to tailor the selection of jobs or tailor the way jobs are conducted so as to avoid interference. The picker movement may comprise the selection of predetermine profiles which are communicated, or may comprise movement in response to the current location and vector of the other picker(s).

Figure 14:
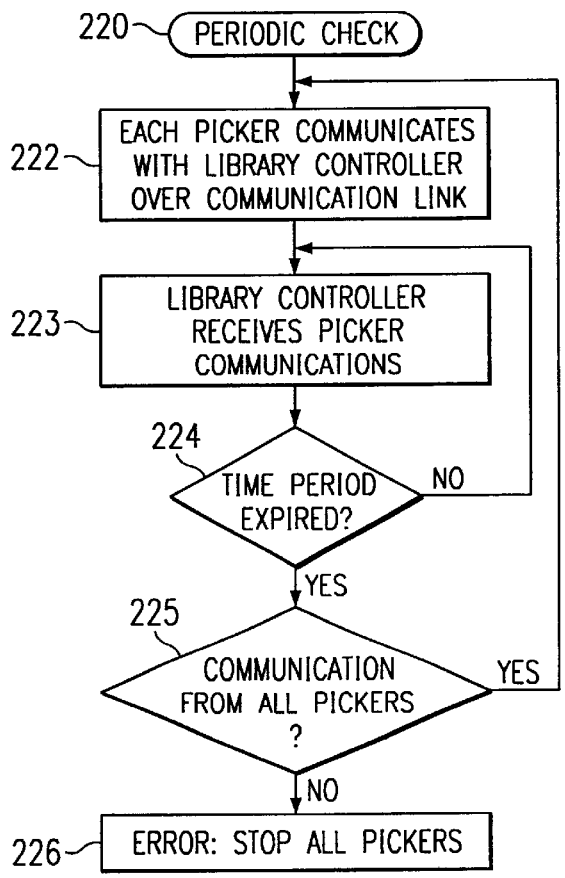
FIG. 14 is a flow chart of a periodic check of the operational status of the pickers.

Referring to FIG. 14, in another aspect of the present invention, a periodic check 220 is conducted to insure that the communication link 32 of FIG. 1 for each picker is in operation, and which may insure that the picker is operating properly. In step 222, each picker communicates with the library controller over the communication link 32 and 33. The communication may comprise a signal which indicates that the picker is operating properly, or may comprise the "heartbeat" information. In step 223, the library controller 22 in FIG. 1 receives the picker communications. Step 224 represents the time period allotted for receipt of the communication from each picker. Thus, if the time period has not expired, step 223 continues. Upon expiration of the time period, "YES", step 225 determines whether the desired communication has been received from all of the pickers. If not, either the communication link or the picker has failed, and step 226 indicates an error, the library controller 22 stops all of the pickers, either by communication with the picker, or, if that is not possible by, for example, terminating the power on the rail 36. Alternatively, the pickers can utilize the "heartbeat" or query steps of FIG. 12A or 16, and add a time limit to step 125 to stop themselves. If the desired communication has been received from all of the pickers, both the communication link and the picker are operating correctly, and the process cycles back to step 222 for again conducting the periodic check.

Thus, in summary, the library effectiveness is increased by the independence of the pickers which no longer require that a central library manager adjust the operation of the pickers because of the presence of picker zones, and no longer requiring the sensing of the situations requiring adjustment of the zones.

While the preferred embodiments of the present invention have been illustrated in detail, it should be apparent that modifications and adaptations to those embodiments may occur to one skilled in the art without departing from the scope of the present invention as set forth in the following claims.

We claim:

1. A computer program product usable with a plurality of programmable computer processors having computer readable program code embodied therein, said programmable computer processors each at a corresponding plurality of pickers in an automated data storage library, each of said pickers having a communication link coupled to said programmable computer processor, said library having a plurality of media storage slots for storing data storage media, a plurality of read/write stations, said media storage slots and said read/write stations arranged so as to be accessible to said pickers, each said picker having at least one gripper for accessing and delivering media at said media storage slots and said read/write stations, said library having a controller receiving input commands for jobs to move media amongst said media storage slots and said read/write stations, said library controller identifying the start and end locations of said received move jobs, and placing said move jobs in a job queue, said computer program product comprising:

computer readable program code which causes each of said picker programmable computer processors to store information received from at least one other said picker over said communication link, said information describing movement of said other picker for a current move job of said other picker;

computer readable program code which causes said picker programmable computer processors to select a move job from said job queue having both said start and said end locations accessible by said picker and which avoids interference with said movement of said at least one other picker;

computer readable program code which causes said picker programmable computer processors, upon selecting said move job, to determine a movement for said selected move job, which movement avoids interference with said movement of said at least one other picker;

computer readable program code which causes said picker programmable computer processors to communicate information describing said movement to said at least one other picker over said communication link;

computer readable program code which causes said programmable computer processors to cause said picker to conduct said move job according to said determined movement.

2. The computer program product of claim 1, wherein said movement information comprises a movement profile comprising at least said start and said end locations, any intermediate location at which said picker will change direction, and a clock time at which said selected move job commences.

3. The computer program product of claim 2, wherein said computer readable program code additionally causes said programmable computer processor at each of said pickers, to determine an area of occupancy both of said picker and of said other picker, adding said areas of occupancy to said interference avoidance for selecting said next move job and for determining said movement profile for said selected move job.

4. The computer program product of claim 2, wherein said computer readable program code additionally causes said programmable computer processor at each of said pickers, to determine said current clock time for selecting said next move job and for determining said movement profile for said selected move job, employing said current clock time and said other picker movement profile to determine the current and projected locations of said at least one other picker.

5. The computer program product of claim 4, wherein said computer readable program code additionally causes said programmable computer processor at each of said pickers to respond to subsequently received present location of said at least one other picker received over said communication link, to compare said subsequently received present location of said at least one other picker to an expected said current determined location of said at least one other picker, and upon said comparison indicating said received and determined locations are different, to abort said move job.

6. The computer program product of claim 1, wherein said computer readable program code additionally causes said programmable computer processor at each of said pickers, upon completion of said move job, to communicate said completion to said library controller, so that said library controller, upon receiving said completion communication, removes said move job from said job queue.

7. The computer program product of claim 1, wherein said computer readable program code additionally causes said programmable computer processor at each of said pickers, to periodically communicate with said library controller so that said library controller, upon failing to receive said communication from any said picker, stops all of said pickers.

8. The computer program product of claim 1, wherein ones of said move jobs are begun by said pickers at a beginning position different from said start location, and wherein said computer readable program code additionally causes said programmable computer processor at each of said pickers, to include in said movement profile for said ones of said move jobs, pre positioning said picker from said beginning position to said start location.

9. The computer program product of claim 8, wherein said pickers exhibit different movement profiles when empty or loaded with said data storage media, and wherein said computer readable program code additionally causes said programmable computer processor at each of said pickers, additionally, to determine said movement profile for said pre positioning comprising an empty movement profile, to determine said movement profile for said move job between said start location and said end locations comprising a loaded movement profile, and wherein each said determined movement profile determined by said picker programmable computer processor comprises at least said beginning position, said start and said end locations, any intermediate location at which said picker will change direction, a clock time at which said move job commences, and wherein said determined movement profile comprises said empty and said loaded movement profiles.

10. The computer program product of claim 1, wherein said movement information comprises at least the present location and vector of said picker, and said end location of said move job of said picker.

11. The computer program product of claim 10, wherein said computer readable program code additionally causes said programmable computer processor of said selecting picker, to select said move job and to determine said movement for said selected move job, by determining, from said other picker movement information, the current and projected locations of said at least one other picker, limited by said end location.

12. The computer program product of claim 11, wherein said computer readable program code additionally causes said programmable computer processor of said selecting picker:

to respond to subsequently received present movement information of said at least one other picker received over said communication link; again determining from said subsequently received other picker movement information, the current and projected locations of said at least one other picker;

to determine whether said determined movement of said selecting picker potentially interferes with any of said again determined current and projected locations of said at least one other picker; and upon determining potential interference, to discontinue said selected move job of said selecting picker.

\* \* \* \* \*

UNITED STATES PATENT AND TRADEMARK OFFICE
CERTIFICATE OF CORRECTION

PATENT NO.    : 6,438,459 B1
DATED         : August 20, 2002
INVENTOR(S)   : Dimitri et al.

It is certified that error appears in the above-identified patent and that said Letters Patent is hereby corrected as shown below:

<u>Title page,</u>
Item [62], change "Division of application No. 09/435,023, filed on Nov. 5, 1999, now abandoned.", to -- Division of application No. 09/435,023, filed on Nov. 5, 1999, now US Patent No. 6,421,579, issued Jul. 16, 2002. --

<u>Column 1,</u>
Lines 15-16, change "Ser. No. 09/435,023, filed Nov. 5, 1999, now abandoned.", to -- Ser. No. 09/435,023, filed Nov. 5, 1999, now US Patent No. 6,421,579, issued Jul. 16, 2002. --

Signed and Sealed this

Fourteenth Day of January, 2003

JAMES E. ROGAN
*Director of the United States Patent and Trademark Office*